US008229250B2

(12) United States Patent
Suzuki et al.

(10) Patent No.: US 8,229,250 B2
(45) Date of Patent: Jul. 24, 2012

(54) PATTERN ALIGNING METHOD, VERIFYING METHOD, AND VERIFYING DEVICE

(75) Inventors: Tomoharu Suzuki, Inagi (JP); Shinichi Eguchi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 801 days.

(21) Appl. No.: 12/368,506

(22) Filed: Feb. 10, 2009

(65) Prior Publication Data

US 2009/0245593 A1 Oct. 1, 2009

(30) Foreign Application Priority Data

Mar. 31, 2008 (JP) .................................. 2008-93476

(51) Int. Cl.
*G06K 9/40* (2006.01)

(52) U.S. Cl. ........ 382/294; 382/284; 382/289; 358/540; 358/450

(58) Field of Classification Search .................... 382/28, 382/289, 294, 296; 358/537, 540, 450
See application file for complete search history.

(56) References Cited

U.S. PATENT DOCUMENTS 5,537,484 A 7/1996 Kobayashi
6,850,252 B1 * 2/2005 Hoffberg ...................... 715/716
7,006,881 B1 * 2/2006 Hoffberg et al. ................ 700/83
7,085,403 B2 8/2006 Allisto et al.
7,590,589 B2 * 9/2009 Hoffberg ....................... 705/37
7,813,822 B1 * 10/2010 Hoffberg ........................ 700/94
2006/0227140 A1 10/2006 Ramani et al.
2007/0269107 A1 11/2007 Iwai et al.
2009/0067691 A1 3/2009 Sato

FOREIGN PATENT DOCUMENTS

EP 1796428 A1 6/2007
JP 62-172482 7/1987
JP 2-187866 A 7/1990
JP 05-233796 A 9/1993
JP 2003-30662 A 1/2003
JP 2006-309656 A 11/2006

OTHER PUBLICATIONS

Korean Office Action dated Aug. 31, 2010, issued in corresponding Korean Patent Application No. 10-2009-0010581.
William Rucklidge, "Efficient Visual Recognition Using the Hausdorff Distance", Lecture Notes in Computer Science 1173, Springer-Verlag, 1996.
Serge Belongie et al., "Shape Matching and Object Recognition Using Shape Contexts", IEEE, Transaction on Pattern Analysis and Machine Intelligence, vol. 24, No. 24, pp. 509-522, Apr. 2002.

(Continued)

*Primary Examiner* — Yosef Kassa
(74) *Attorney, Agent, or Firm* — Westerman, Hattori, Daniels & Adrian, LLP

(57) ABSTRACT

A pattern alignment method performs alignment of the comparison source pattern or the comparison target pattern that has been subjected to the angle-scale conversion with the comparison source pattern. Angular deviations and scale factors between the comparison source pattern and the comparison target pattern are computed separately, after angle and scale conversion, the measured template matching is performed. Therefore, parallel-displacement alignment can be made faster and precise alignment is possible. Template matching processing can be minimized, and aligning can be performed precisely and rapidly.

22 Claims, 15 Drawing Sheets

(INPUT) CURVE CHARACTERISTICS
CHARACTERISTIC CONVERSION
S10 ① LINE SEGMENT DATA GENERATION
S12 ② LINE SEGMENT CHARACTERISTIC GENERATION
OPTIMUM AFFINE TRANSFORMATION SEARCH
S14 ③ ANGLE ESTIMATION
S16 ④ SCALE ESTIMATION
S18 ⑤ ANGLE-SCALE CONVERSION
S20 ⑥ PARALLEL-DISPLACEMENT ALIGNMENT
S22 ⑦ AFFINE TRANSFORMATION PARAMETER OPTIMIZATION
(OUTPUT) AFFINE TRANSFORMATION

OTHER PUBLICATIONS

Zheng, X. et al.; "Some New Results on Non-rigid Correspondence and Classification of Curves"; Energy Minimization Methods in Computer Vision and Pattern Recognition Lecture Notes in Computer Science; ; LNCS, Jan. 2005, vol. 3757, pp. 473-489.
Adjeroh, D. et. al.; "BWT-Based Efficient Shape Matching" PROC. SAC'07, Mar. 11, 2007, pp. 1079-1085.
Grigorescu, C. et al.; "Distance Sets for Shape Filters and Shape Recognition" IEEE Transactions on Image Processing, Oct. 2003, pp. 1274-1286, vol. 12, No. 10, pp. 1274-1286.
Kwan, P. et al.; "Fingerprint Matching Using Enhanced Shape Context"; PROC. Image and Vision Computing, [Online] 2006, pp. 115-120.
European Search Report dated Aug. 21, 2009, issued in corresponding European Patent Application No. 09151649.2.
Japanese Office Action dated Mar. 6, 2012, issued in corresponding application 2008-093476.

* cited by examiner

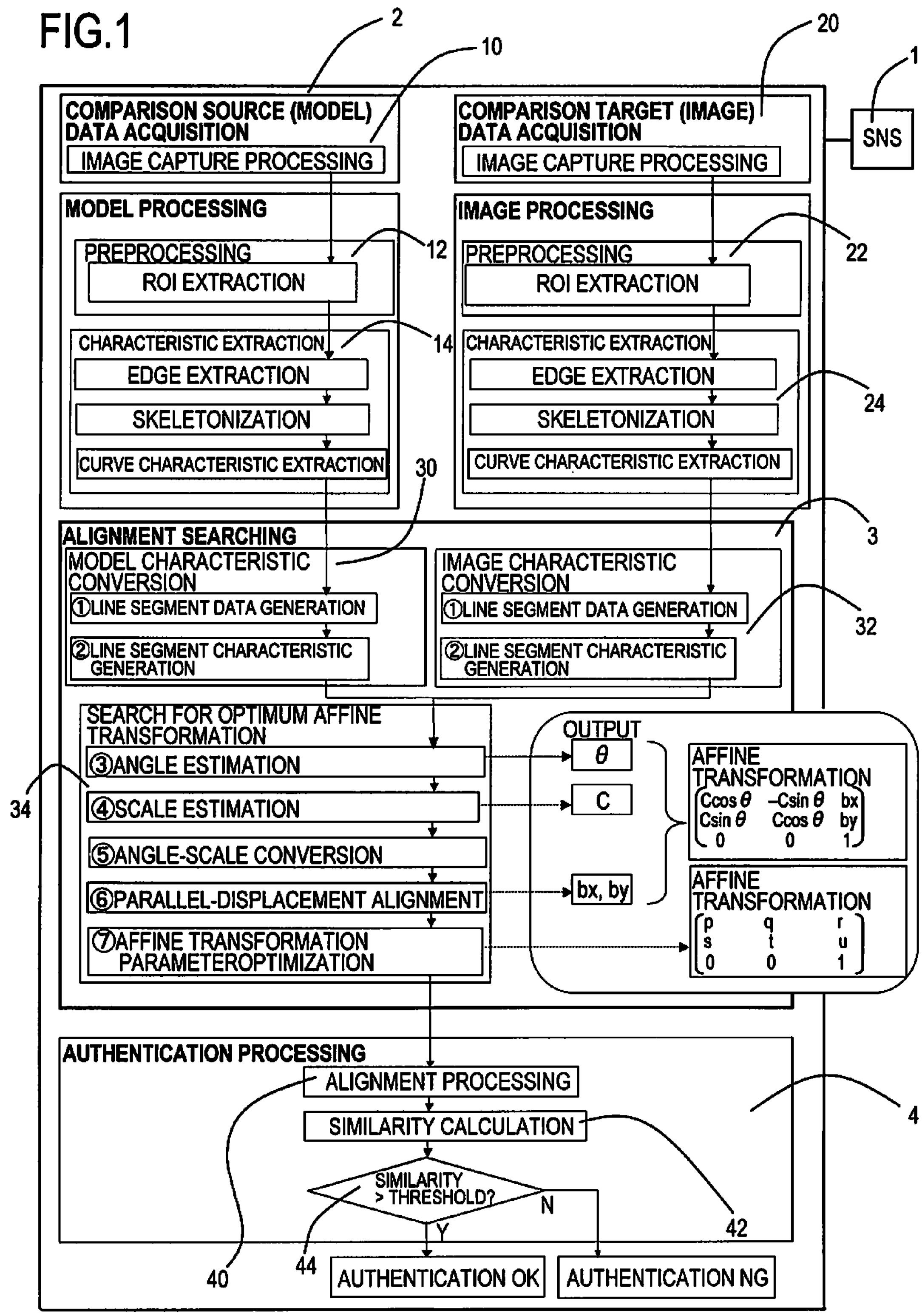
FIG.1
2
10
20
1
COMPARISON SOURCE (MODEL) DATA ACQUISITION
IMAGE CAPTURE PROCESSING
COMPARISON TARGET (IMAGE) DATA ACQUISITION
IMAGE CAPTURE PROCESSING
SNS
MODEL PROCESSING
PREPROCESSING
ROI EXTRACTION
12
IMAGE PROCESSING
PREPROCESSING
ROI EXTRACTION
22
CHARACTERISTIC EXTRACTION
EDGE EXTRACTION
SKELETONIZATION
CURVE CHARACTERISTIC EXTRACTION
14
CHARACTERISTIC EXTRACTION
EDGE EXTRACTION
SKELETONIZATION
CURVE CHARACTERISTIC EXTRACTION
24
30
3
ALIGNMENT SEARCHING
MODEL CHARACTERISTIC CONVERSION
①LINE SEGMENT DATA GENERATION
②LINE SEGMENT CHARACTERISTIC GENERATION
IMAGE CHARACTERISTIC CONVERSION
①LINE SEGMENT DATA GENERATION
②LINE SEGMENT CHARACTERISTIC GENERATION
32
SEARCH FOR OPTIMUM AFFINE TRANSFORMATION
③ANGLE ESTIMATION
④SCALE ESTIMATION
⑤ANGLE-SCALE CONVERSION
⑥PARALLEL-DISPLACEMENT ALIGNMENT
⑦AFFINE TRANSFORMATION PARAMETEROPTIMIZATION
34
OUTPUT
θ
C
bx, by
AFFINE TRANSFORMATION
Ccos θ −Csin θ bx
Csin θ Ccos θ by
0 0 1
AFFINE TRANSFORMATION
p q r
s t u
0 0 1
AUTHENTICATION PROCESSING
ALIGNMENT PROCESSING
SIMILARITY CALCULATION
SIMILARITY > THRESHOLD?
N
Y
4
42
40
44
AUTHENTICATION OK
AUTHENTICATION NG

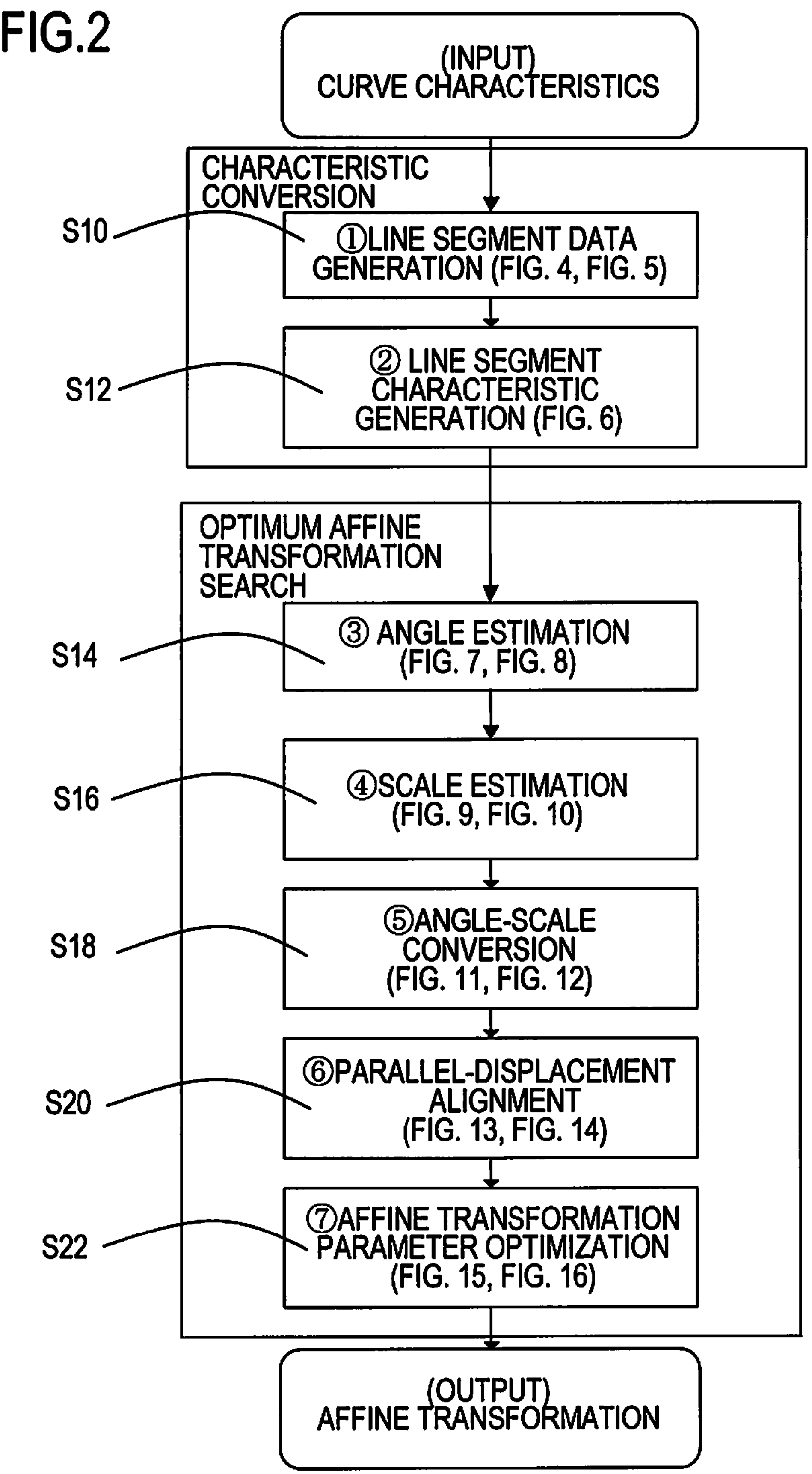
FIG.2
(INPUT)
CURVE CHARACTERISTICS
CHARACTERISTIC CONVERSION
S10
①LINE SEGMENT DATA GENERATION (FIG. 4, FIG. 5)
S12
② LINE SEGMENT CHARACTERISTIC GENERATION (FIG. 6)
OPTIMUM AFFINE TRANSFORMATION SEARCH
S14
③ ANGLE ESTIMATION (FIG. 7, FIG. 8)
S16
④SCALE ESTIMATION (FIG. 9, FIG. 10)
S18
⑤ANGLE-SCALE CONVERSION (FIG. 11, FIG. 12)
S20
⑥PARALLEL-DISPLACEMENT ALIGNMENT (FIG. 13, FIG. 14)
S22
⑦AFFINE TRANSFORMATION PARAMETER OPTIMIZATION (FIG. 15, FIG. 16)
(OUTPUT)
AFFINE TRANSFORMATION

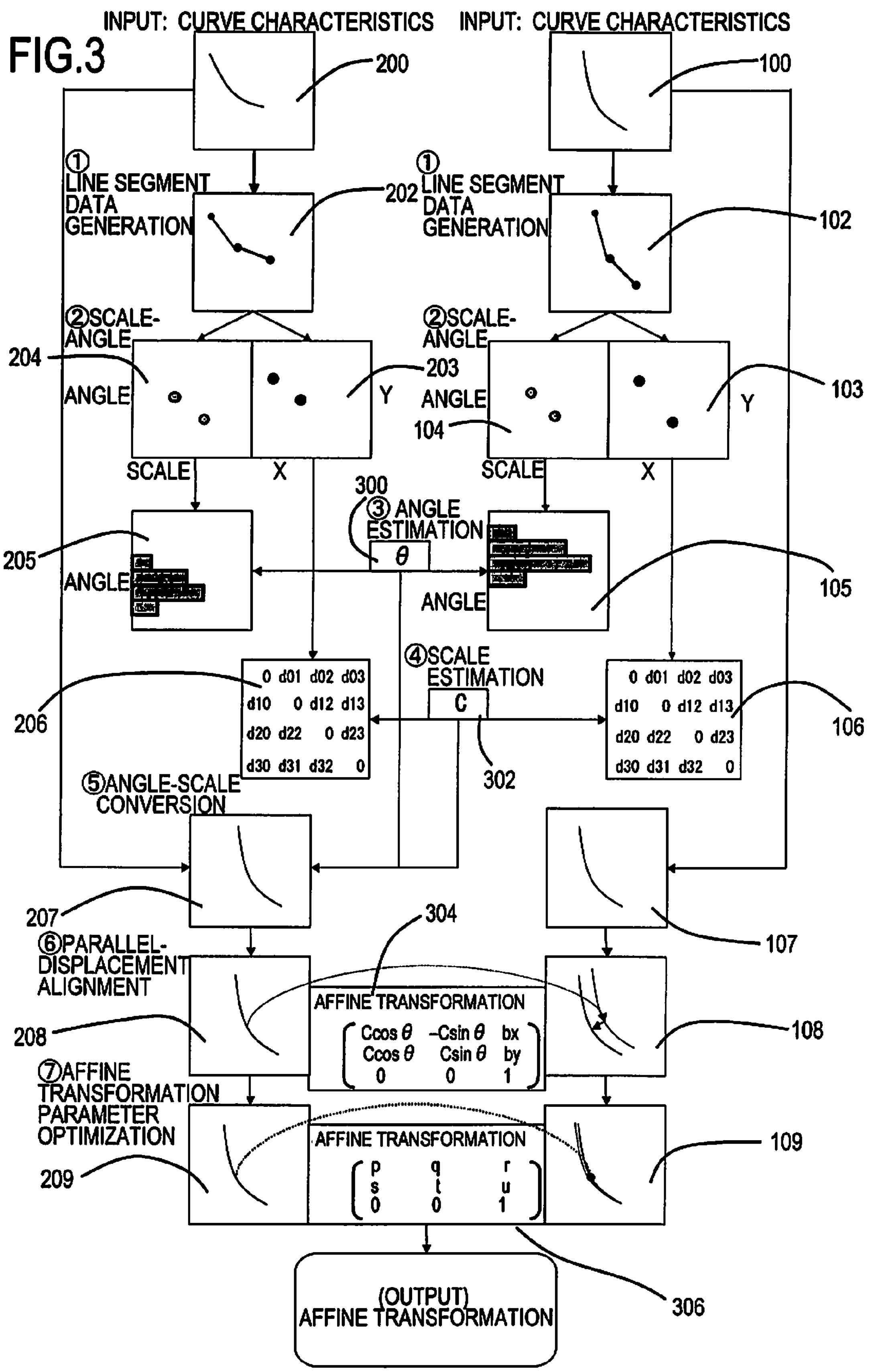
FIG.3
INPUT: CURVE CHARACTERISTICS
INPUT: CURVE CHARACTERISTICS
200
100
① LINE SEGMENT DATA GENERATION
① LINE SEGMENT DATA GENERATION
202
102
②SCALE-ANGLE
②SCALE-ANGLE
204
ANGLE
203
Y
ANGLE
104
103
Y
SCALE
X
SCALE
X
300
③ ANGLE ESTIMATION
θ
205
ANGLE
ANGLE
105
④SCALE ESTIMATION
C
0 d01 d02 d03
d10 0 d12 d13
d20 d22 0 d23
d30 d31 d32 0
0 d01 d02 d03
d10 0 d12 d13
d20 d22 0 d23
d30 d31 d32 0
206
106
302
⑤ANGLE-SCALE CONVERSION
207
107
304
⑥PARALLEL-DISPLACEMENT ALIGNMENT
AFFINE TRANSFORMATION
Ccos θ –Csin θ bx
Ccos θ Csin θ by
0 0 1
208
108
⑦AFFINE TRANSFORMATION PARAMETER OPTIMIZATION
AFFINE TRANSFORMATION
p q r
s t u
0 0 1
209
109
(OUTPUT) AFFINE TRANSFORMATION
306

FIG.4

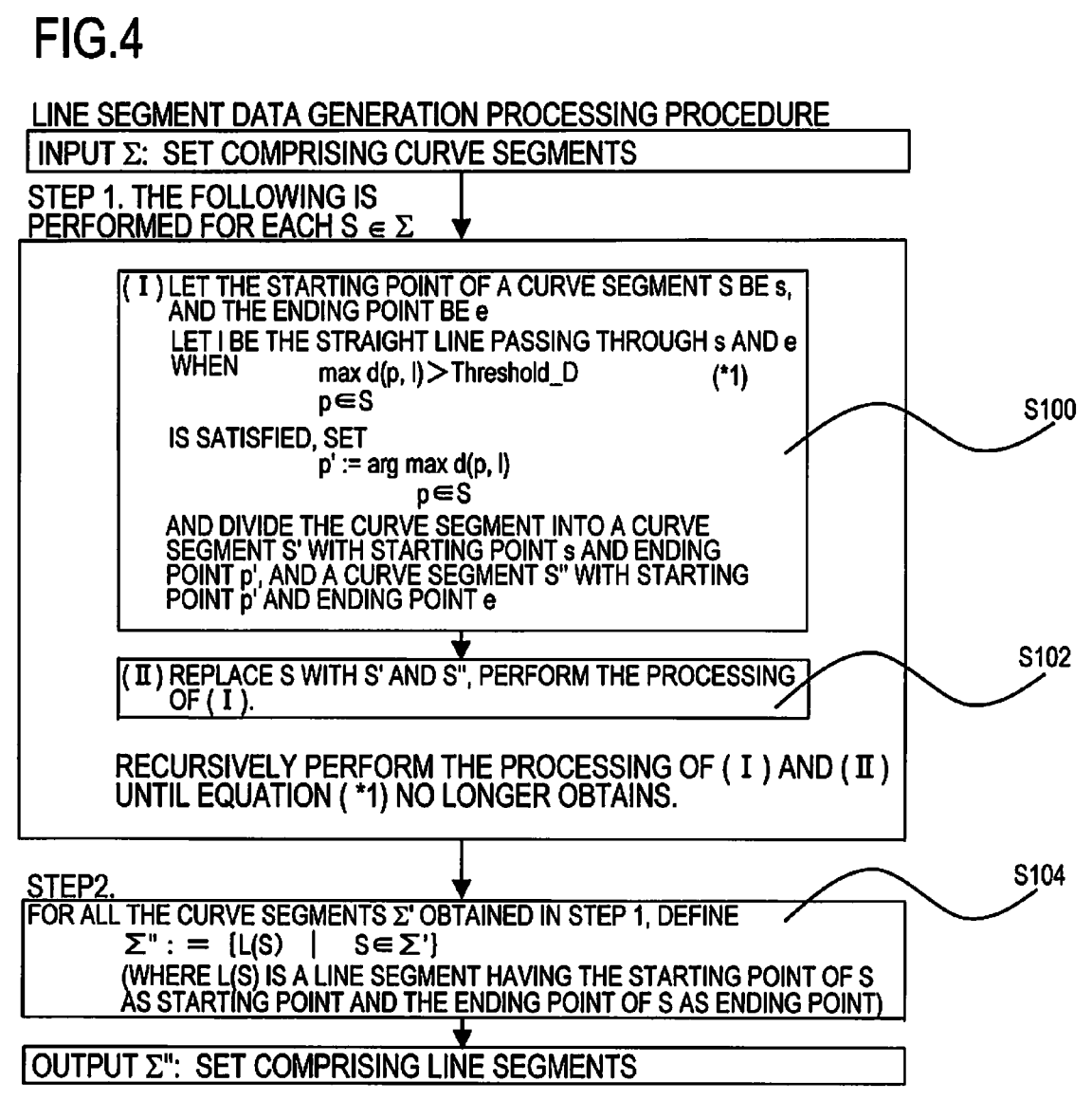

LINE SEGMENT DATA GENERATION PROCESSING PROCEDURE

INPUT Σ: SET COMPRISING CURVE SEGMENTS

STEP 1. THE FOLLOWING IS PERFORMED FOR EACH $S \in \Sigma$ ( I ) LET THE STARTING POINT OF A CURVE SEGMENT S BE s, AND THE ENDING POINT BE e
LET l BE THE STRAIGHT LINE PASSING THROUGH s AND e
WHEN $$\max_{p \in S} d(p, l) > \text{Threshold\_D} \quad (*1)$$

IS SATISFIED, SET $$p' := \arg\max_{p \in S} d(p, l)$$

AND DIVIDE THE CURVE SEGMENT INTO A CURVE SEGMENT S' WITH STARTING POINT s AND ENDING POINT p', AND A CURVE SEGMENT S" WITH STARTING POINT p' AND ENDING POINT e

S100

( II ) REPLACE S WITH S' AND S", PERFORM THE PROCESSING OF ( I ).

S102

RECURSIVELY PERFORM THE PROCESSING OF ( I ) AND ( II ) UNTIL EQUATION ( *1) NO LONGER OBTAINS.

STEP2.

FOR ALL THE CURVE SEGMENTS Σ' OBTAINED IN STEP 1, DEFINE $$\Sigma'' := \{L(S) \mid S \in \Sigma'\}$$

(WHERE L(S) IS A LINE SEGMENT HAVING THE STARTING POINT OF S AS STARTING POINT AND THE ENDING POINT OF S AS ENDING POINT)

S104

OUTPUT Σ": SET COMPRISING LINE SEGMENTS

STEP1.
CURVE SEGMENT S
ENDING POINT e
POINT p'
START POINT s
max d(p, L)
p∈S
STRAIGHT LINE l
CURVE SEGMENT S"
CURVE SEGMENT S'
STEP2.
LINE SEGMENT L(S")
LINE SEGMENT L(S')

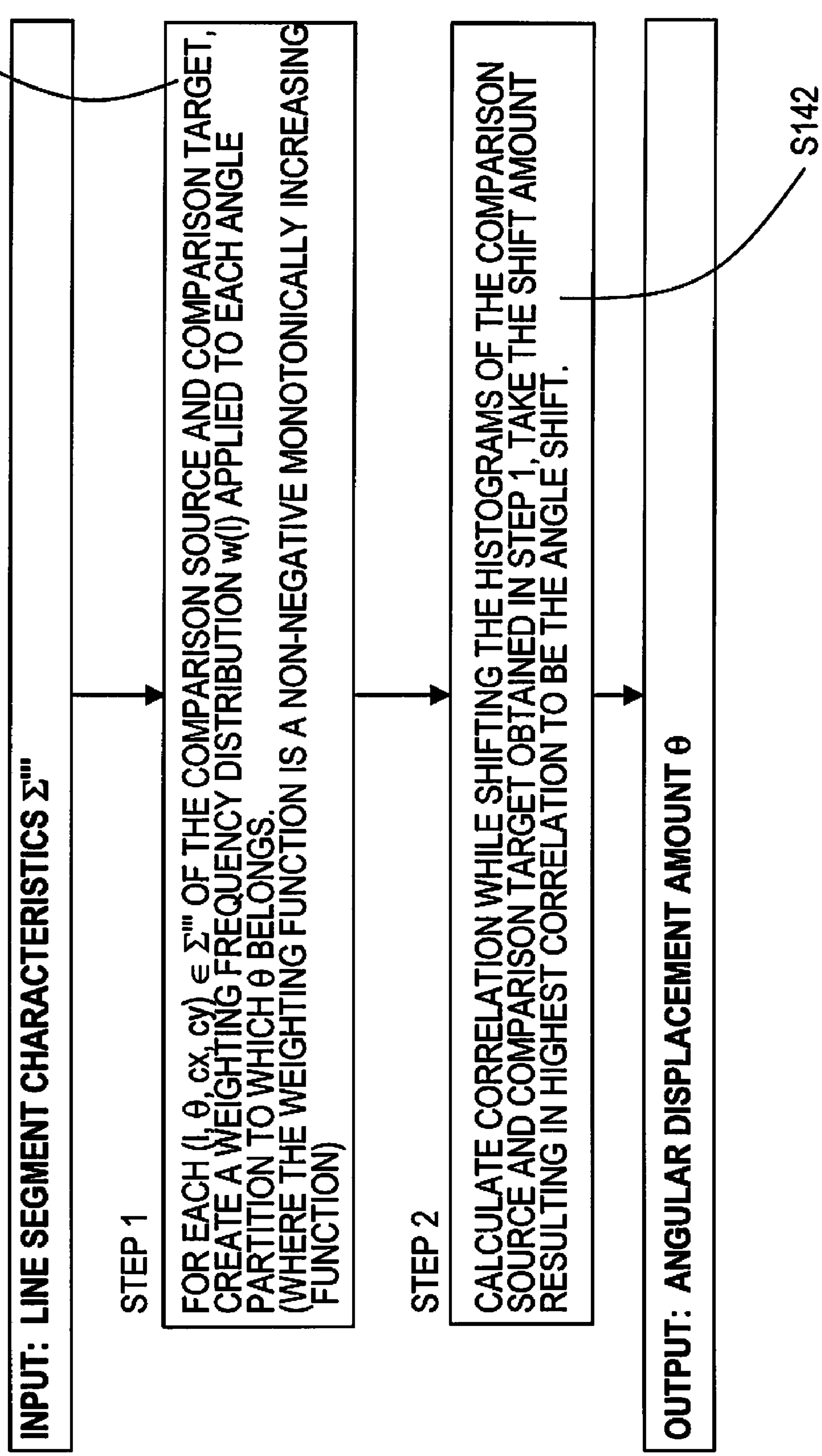
FIG.7
ANGLE ESTIMATION PROCEDURE (S14)
INPUT: LINE SEGMENT CHARACTERISTICS Σ'''
STEP 1
FOR EACH (l, θ, cx, cy) ∈ Σ''' OF THE COMPARISON SOURCE AND COMPARISON TARGET, CREATE A WEIGHTING FREQUENCY DISTRIBUTION w(l) APPLIED TO EACH ANGLE PARTITION TO WHICH θ BELONGS. (WHERE THE WEIGHTING FUNCTION IS A NON-NEGATIVE MONOTONICALLY INCREASING FUNCTION)
S140
STEP 2
CALCULATE CORRELATION WHILE SHIFTING THE HISTOGRAMS OF THE COMPARISON SOURCE AND COMPARISON TARGET OBTAINED IN STEP 1, TAKE THE SHIFT AMOUNT RESULTING IN HIGHEST CORRELATION TO BE THE ANGLE SHIFT.
S142
OUTPUT: ANGULAR DISPLACEMENT AMOUNT θ

WEIGHTING FUNCTION
W(ℓ)
ℓ
COMPARISON SOURCE FREQUENCY DISTRIBUTION
WEIGHTING FUNCTION
ANGLE
COMPARISON TARGET FREQUENCY DISTRIBUTION
WEIGHTING FUNCTION
ANGLE
DETECT SHIFT AMOUNT θ FOR WHICH CORRELATION IS MAXIMUM
WEIGHTING FUNCTION
ANGLE
ANGULAR DISPLACEMENT AMOUNT θ

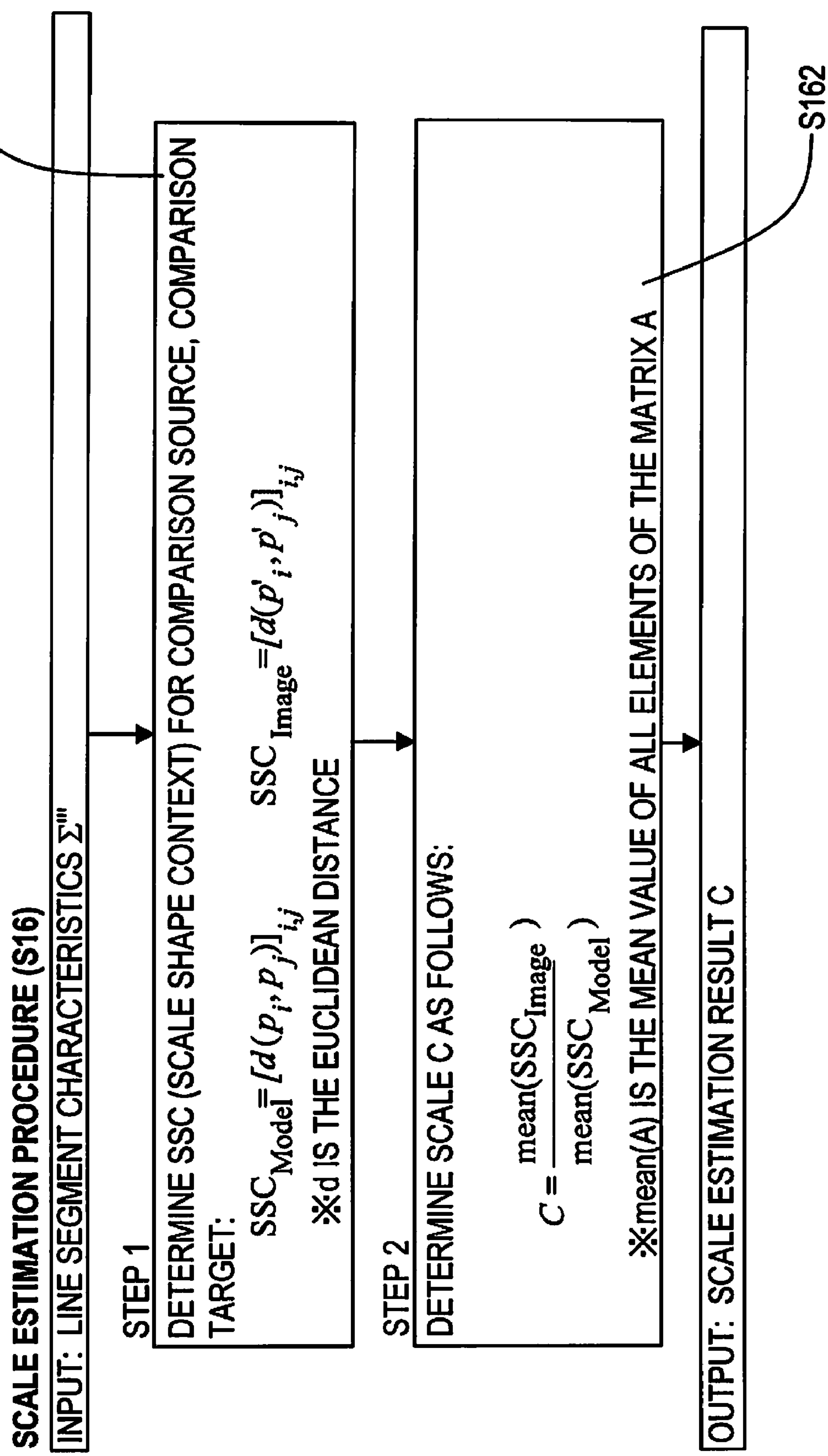
FIG.9
SCALE ESTIMATION PROCEDURE (S16)
INPUT: LINE SEGMENT CHARACTERISTICS Σ'''
S160
STEP 1
DETERMINE SSC (SCALE SHAPE CONTEXT) FOR COMPARISON SOURCE, COMPARISON TARGET:
$SSC_{Model} = [d(p_i, p_j)]_{i,j}$ $SSC_{Image} = [d(p'_i, p'_j)]_{i,j}$
※d IS THE EUCLIDEAN DISTANCE
STEP 2
DETERMINE SCALE C AS FOLLOWS:
$C = \frac{mean(SSC_{Image})}{mean(SSC_{Model})}$
※mean(A) IS THE MEAN VALUE OF ALL ELEMENTS OF THE MATRIX A
S162
OUTPUT: SCALE ESTIMATION RESULT C CASE IN WHICH ALL CENTER POINTS OF COMPARISON SOURCE (MODEL) = {p1, p2, p3, p4}, ALL CENTER POINTS OF COMPARISON TARGET (IMAGE) = {q1, q2, q3, q4}
STEP1.
MODEL CENTER POINT SET
p1
p2
p3
p4
IMAGE CENTER POINT SET
q1
q2
q3
q4
STEP2.
MODEL MATRIX SSC
d(p1,p1) d(p1,p2) d(p1,p3) d(p1,p4)
d(p2,p1) d(p2,p2) d(p2,p3) d(p2,p4)
d(p3,p1) d(p3,p2) d(p3,p3) d(p3,p4)
d(p4,p1) d(p4,p2) d(p4,p3) d(p4,p4)
IMAGE MATRIX SSC
d(q1,q1) d(q1,q2) d(q1,q3) d(q1,q4)
d(q2,q1) d(q2,q2) d(q2,q3) d(q2,q4)
d(q3,q1) d(q3,q2) d(q3,q3) d(q3,q4)
d(q4,q1) d(q4,q2) d(q4,q3) d(q4,q4)
SCALE ESTIMATION RESULT C

FIG.11

ANGLE-SCALE CONVERSION PROCEDURE (S18)

INPUT: ESTIMATED ANGLE θ

ESTIMATED SCALE C

CURVE PATTERN MODEL

STEP1.

PERFORM SCALE-ROTATION CONVERSION FOR CURVE PATTERN OF COMPARISON SOURCE (MODEL).
FOR EACH POINT (x, y) ∈ (CURVE PATTERN)Model, DETERMINE CONVERTED POINTS (x', y') USING $$x' = (C\cos\theta)x + (-C\sin\theta)y$$
$$y' = (C\sin\theta)x + (C\cos\theta)y$$

OUTPUT: CURVE PATTERN MODEL (AFTER ROTATION, SCALE CONVERSION)

FIG.12

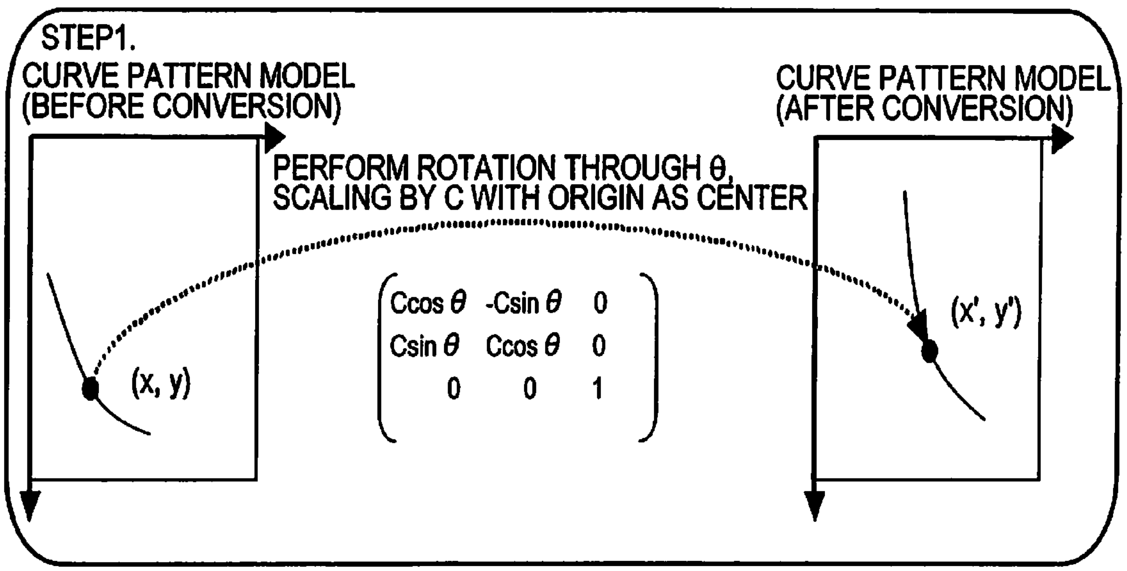

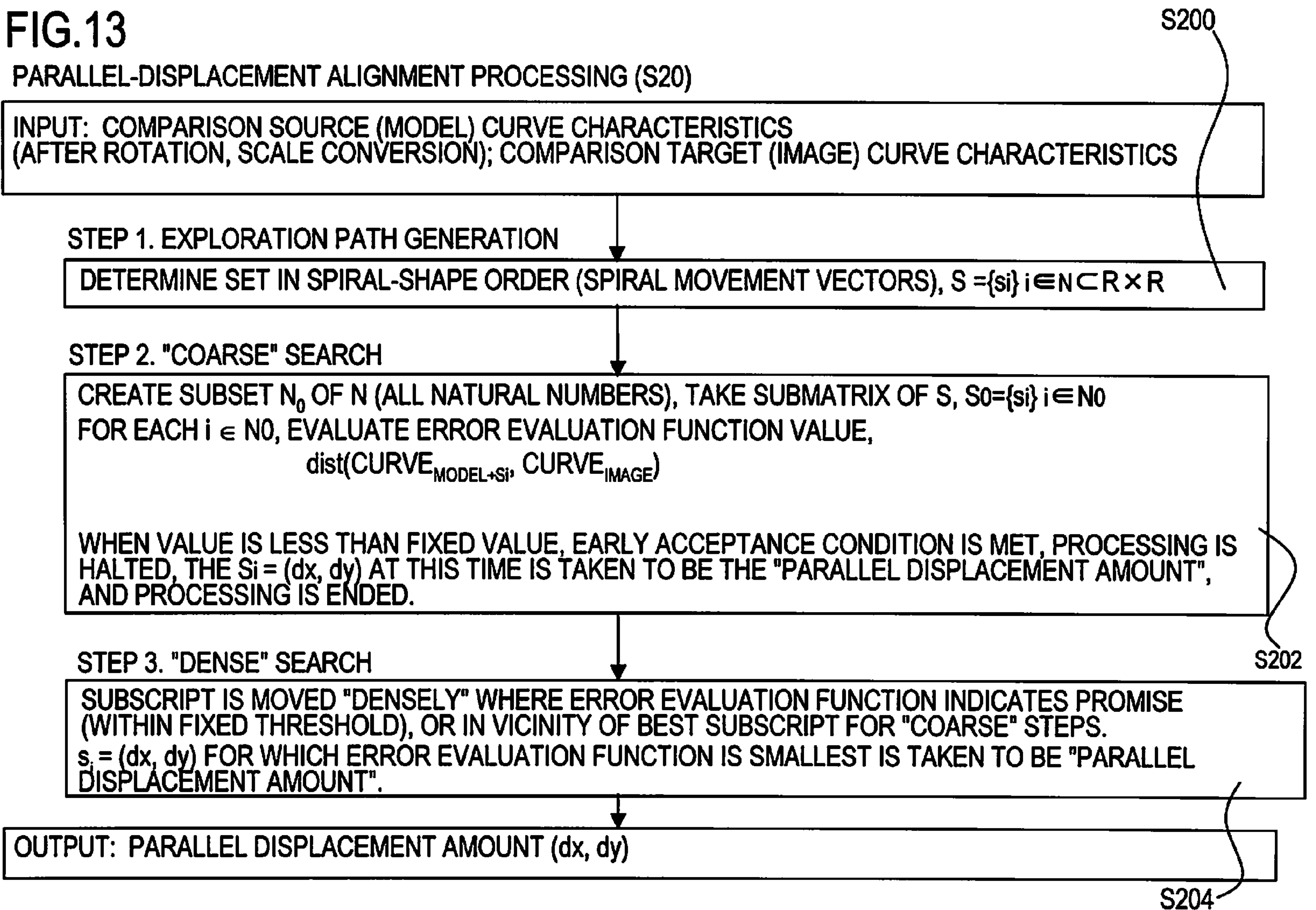
FIG.13
PARALLEL-DISPLACEMENT ALIGNMENT PROCESSING (S20)
S200
INPUT: COMPARISON SOURCE (MODEL) CURVE CHARACTERISTICS (AFTER ROTATION, SCALE CONVERSION); COMPARISON TARGET (IMAGE) CURVE CHARACTERISTICS
STEP 1. EXPLORATION PATH GENERATION
DETERMINE SET IN SPIRAL-SHAPE ORDER (SPIRAL MOVEMENT VECTORS), $S = \{si\}\ i \in N \subset R \times R$
STEP 2. "COARSE" SEARCH
CREATE SUBSET $N_0$ OF N (ALL NATURAL NUMBERS), TAKE SUBMATRIX OF S, $S0=\{si\}\ i \in N0$
FOR EACH $i \in N0$, EVALUATE ERROR EVALUATION FUNCTION VALUE,
$dist(CURVE_{MODEL+Si}, CURVE_{IMAGE})$
WHEN VALUE IS LESS THAN FIXED VALUE, EARLY ACCEPTANCE CONDITION IS MET, PROCESSING IS HALTED, THE Si = (dx, dy) AT THIS TIME IS TAKEN TO BE THE "PARALLEL DISPLACEMENT AMOUNT", AND PROCESSING IS ENDED.
S202
STEP 3. "DENSE" SEARCH
SUBSCRIPT IS MOVED "DENSELY" WHERE ERROR EVALUATION FUNCTION INDICATES PROMISE (WITHIN FIXED THRESHOLD), OR IN VICINITY OF BEST SUBSCRIPT FOR "COARSE" STEPS.
$s_i$ = (dx, dy) FOR WHICH ERROR EVALUATION FUNCTION IS SMALLEST IS TAKEN TO BE "PARALLEL DISPLACEMENT AMOUNT".
OUTPUT: PARALLEL DISPLACEMENT AMOUNT (dx, dy)
S204

INPUT:COMPARISON SOURCE (MODEL) CURVE CHARACTERISTICS (AFTER ROTATION, SCALE CONVERSION)
INPUT: COMPARISON TARGET (IMAGE) CURVE CHARACTERISTICS
207
100
STEP 1 EXPLORATION PATH GENERATION
S200
EXPLORATION PATH
※「●」: REFERENCE POINT (ROI CENTER, CENTER OF GRAVITY USED)
STEP 2. "COARSE" SEARCH
S202
※「●」: So ELEMENT POINTS
STEP 3 "FINE" SEARCH
S204
PARALLEL DISPLACEMENT AMOUNT (dx, dy)

PATTERN ALIGNING METHOD, VERIFYING METHOD, AND VERIFYING DEVICE

CROSS-REFERENCE TO RELATED APPLICATIONS

This application is based upon and claims the benefit of priority of the prior Japanese Patent Application No. 2008-93476, filed on Mar. 31, 2008, the entire contents of which are incorporated herein by reference.

FIELD

The present invention relates to a pattern alignment method to align linear patterns for verifying, and to a verifying method and verifying device, and in particular relates to a pattern alignment method, verifying method, and verifying device, suitable for rapid verifying of linear patterns for verifying with regard to numerous registered linear patterns.

BACKGROUND

In the field of automated recognition, automated recognition is performed by verifying a registered pattern with a pattern for verifying. The diversification of patterns in recent years has led to demands for technology capable of rapid alignment. For example, with the development of biometrics technology in recent years, various devices have been provided which recognize the characteristics of a body part which is a portion of a human body. In such devices, after aligning a pattern for verifying with a registered template, verifying is performed. For example, patterns such as fingerprints and toeprints, the retina of an eye, facial features, blood vessel patterns, and similar may be verified against a registered pattern to perform individual authentication.

In such verifying processing, the alignment processing time and precision are greatly affected by the processing time and precision of verifying processing.

In the prior art, various template matching methods have been proposed as pattern alignment techniques (see for example W. Rucklidge, "Efficient Visual Recognition Using the Hausdorff Distance", Lecture Notes in Computer Science 1173, Springer-Verlag, 1996; Japanese Patent Laid-open No. 2003-30662; Japanese Patent Laid-open No. 5-233796).

The template matching methods employ an original pattern for comparison as a template, and perform operations to apply a target pattern for comparison to the template, and affine transformations and other techniques are utilized.

As other pattern alignment techniques, methods based on correspondence relationships and least-squares methods have also been proposed (see for example S. Belongie, J. Malik, J. Puzicha, "Shape Verifying and Object Recognition Using Shape Contexts", IEEE Trans. Pattern Analysis and Machine Intelligence, Vol. 24, No. 24, pp. 509 to 522, April 2002).

These are methods in which the Hungarian method or similar is employed for pattern correspondence relationships, to decide the optimum alignment based on predictions.

However, in methods of the prior art based on a template, patterns themselves are matched to the template, so that there are numerous geometrical conversion parameters for alignment. As the number of these geometric conversion parameters increases, processing time increases exponentially, so that there is the problem that long processing times are required. Moreover, there is the problem that global errors are large.

On the other hand, methods employing correspondence relationships and least-squares techniques require the Hungarian method or similar for calculation of correspondence relationships, so that processing times are lengthened, and moreover there is the problem that local errors are large.

SUMMARY

Hence an object of this invention is to provide a pattern alignment method, verifying method, and verifying device, capable of rapid alignment of linear patterns.

A further object of this invention is to provide a pattern alignment method, verifying method, and verifying device, for rapid alignment of numerous linear patterns.

Still a further object of this invention is to provide a pattern alignment method, verifying method, and verifying device, for rapid and highly precise alignment of numerous linear patterns.

To achieve the above-described objects, a pattern alignment method, includes: a first step of calculating an angle, scale, center point X coordinate, and center point Y coordinate, for each of a comparison source pattern and a comparison target pattern; a second step of calculating an angle deviation between the comparison source pattern and the comparison target pattern, from the angle and scale for the comparison source pattern and the comparison target pattern; a third step of calculating scale ratios of the comparison source pattern and the comparison target pattern, from the center point X coordinates and center point Y coordinates of the comparison source pattern and the comparison target pattern; a fourth step of performing angle and scale conversion of the comparison source pattern and the comparison target pattern, using the angle and ratios; and a fifth of, by using template matching, performing alignment of the comparison source pattern or the comparison target pattern that has been subjected to the angle-scale conversion with the comparison source pattern or the comparison target pattern that has not been subjected to the angle-scale conversion.

Further, a pattern verifying method, includes: a first step of calculating an angle, scale, center point x coordinate, and center point Y coordinate, for each of a comparison source pattern and a comparison target pattern; a second step of calculating an angle deviation between the comparison source pattern and the comparison target pattern, from the angle and scale for the comparison source pattern and the comparison target pattern; a third step of calculating scale ratios of the comparison source pattern and the comparison target pattern, from the center point X coordinates and center point Y coordinates of the comparison source pattern and the comparison target pattern; a fourth step of performing angle and scale conversion of the comparison source pattern and the comparison target pattern, using the angle and ratio; a fifth step of, by using template matching, performing alignment of the comparison source pattern or the comparison target pattern that has been subjected to the angle-scale conversion with the comparison source pattern or the comparison target pattern that has not been subjected to the angle-scale conversion; and a sixth step of calculating similarity of the aligned comparison source pattern and the comparison target pattern, and performing verifying.

Further, a pattern verifying device includes: an acquisition unit which acquires a comparison target pattern; and a verifying unit which verifies a comparison source pattern with the comparison target pattern. And the verifying unit calculates an angle, scale, center point X coordinate, and center point Y coordinate for each of the comparison source pattern and the comparison target pattern, calculates an angle deviation between the comparison source pattern and the comparison target pattern from the angle and scale of the comparison source pattern and the comparison target pattern, calculates the scale ratio of the comparison source pattern and the comparison target pattern from the center point X coordinate and center point Y coordinate of the comparison source pattern and the comparison target pattern, angle-scale converts the comparison source pattern or the comparison target pattern using the angle and ratio, aligns the comparison source pattern or the comparison target pattern that has been subjected to angle-scale conversion, and the comparison source pattern or the comparison target pattern that has not been subjected to angle-scale conversion by template verifying, and calculates the similarity of the comparison source pattern and the comparison target pattern after the alignment to perform verify.

Additionally, according to the present invention, it is preferable that the first step includes a step of calculating the angle, scale, center point X coordinate, and center point Y coordinate, for each of a plurality of the comparison source patterns and a plurality of the comparison target patterns; the second step includes a step of calculating the angle deviations from each of angles and scales of the plurality of comparison source patterns and the plurality of comparison target patterns; and the third step includes a step of calculating the ratios from the center point X coordinates and center point Y coordinates of the plurality of comparison source patterns and the plurality of comparison target patterns.

Further, according to the present invention, it is preferable that a pattern alignment method further includes a step of converting a comparison source curve pattern into a linear comparison source pattern, and a step of converting a comparison target curve pattern into a linear comparison target pattern.

Furthermore, according to the present invention, it is preferable that the second step has a step of creating a first angle distribution in which scales of the comparison source pattern are angle frequencies and of creating a second angle distribution in which scales of the comparison target pattern are angle frequencies, and a step of calculating the angle deviation from the first and second angle distributions.

Additionally, according to the present invention, it is preferable that the step of creating angle distributions comprises a step of weighting, by a weighting function, the scales of the comparison source pattern and the comparison target pattern to be converted into the frequencies.

Further, according to the present invention, it is preferable that the third step includes a step of calculating scale shape contexts of each of the comparison source pattern and the comparison target pattern from the center point X coordinates and center point Y coordinates of the comparison source pattern and the comparison target pattern, and a step of calculating a scale ratio from mean values of each of elements of each of the scale shape contexts.

Furthermore, according to the present invention, it is preferable that the fifth step includes a step of parallel-displacement aligning the comparison source pattern or the comparison target pattern that has been subjected to the angle-scale conversion, to the comparison source pattern or the comparison target pattern that has not been not subjected to the angle-scale conversion.

Because angular deviations and scale factors between the comparison source pattern and the comparison target pattern are computed separately, after angle and scale conversion, the measured template verifying is performed, so that template matching processing can be minimized, and aligning can be performed precisely and rapidly.

Additional objects and advantages of the invention (embodiment) will be set forth in part in the description which follows, and in part will be obvious from the description, or may be learned by practice of the invention.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF DRAWINGS

FIG. 1 shows the configuration of the authentication system of one embodiment of the invention;

FIG. 2 shows the flow of alignment search processing in FIG. 1;

FIG. 3 explains the processing of alignment search processing of FIG. 2;

FIG. 4 is a flow diagram of the line segment data creation processing of FIG. 2;

FIG. 7 is a flowchart of the processing of deviations in the angles of line segment groups are obtained of FIG. 2;

FIG. 9 is a flowchart of the scale estimation processing of FIG. 2;

FIG. 11 is a flowchart of the angle-scale conversion processing of FIG. 2;

FIG. 12 explains the angle-scale conversion processing of FIG. 11;

FIG. 13 is a flowchart of the affine transformation processing of the parallel displacement of FIG. 2;

DESCRIPTION OF EMBODIMENTS

Figure 5:
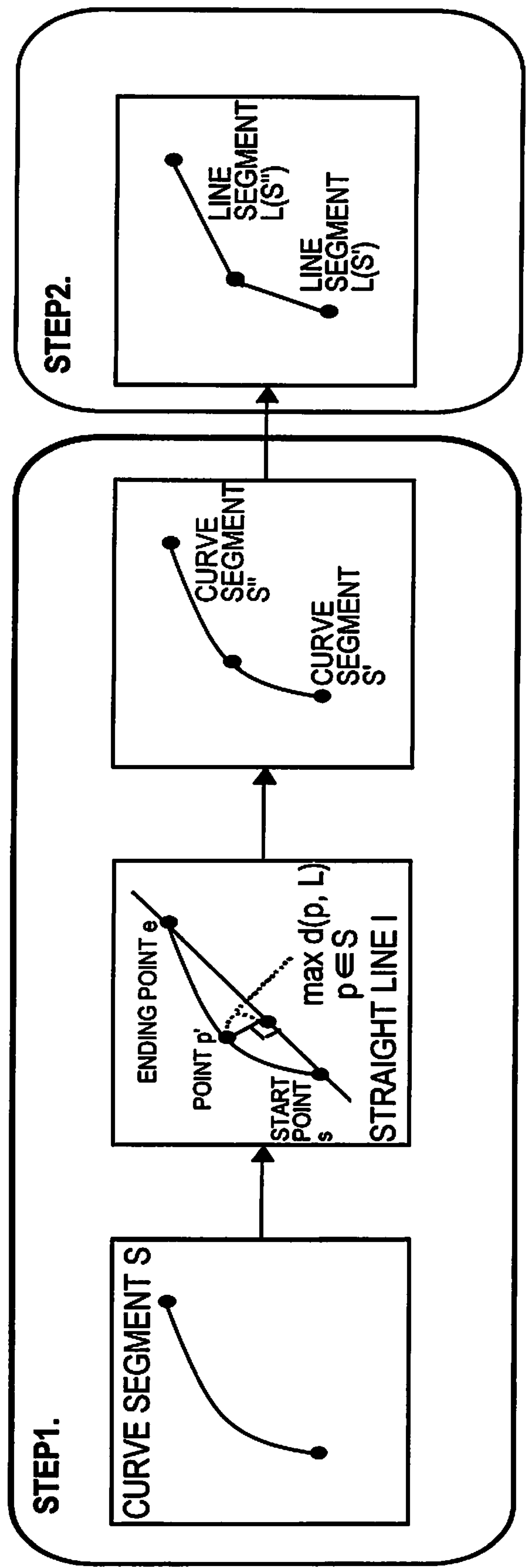
FIG. 5 explains operation of the line segment data creation processing of FIG. 4.

Below, embodiments of the invention are explained, in the order of an authentication system, alignment processing, characteristic conversion processing, optimum affine transformation processing, and other embodiments.

(Authentication System)

FIG. 1 shows the configuration of the authentication system of one embodiment of the invention. FIG. 1 shows a blood vessel pattern authentication system, as an example of an authentication system.

The authentication system has a blood vessel pattern image capture device 1, and a processing device 2 connected thereto. Operation of this system is explained below. A user who has requested blood vessel pattern authentication places his hand out over the blood vessel pattern image capture device 1 (hereafter called the "image capture device"). The image capture device 1 reads the blood vessel pattern image, and the blood vessel pattern is extracted by blood vessel image extraction processing of the processing device 2, and is registered (stored) in a biometrics database file (comparison source data file) as blood vessel pattern data.

In order to perform individual authentication, the user holds his hand out over the image capture device 1. The image capture device 1 reads a blood vessel pattern image, and the blood vessel pattern is extracted by blood vessel extraction processing performed by the processing device 2. The processing device 2 performs verification processing to verify the blood vessel pattern, as blood vessel pattern data, against blood vessel data registered in the biometrics database file, to perform individual authentication.

As shown in FIG. 1, the processing device 2 performs comparison source data acquisition processing 10 and comparison source model (data) processing 12 and 14, and extracts curve characteristics from the comparison source data. The processing device 2 also performs comparison target data acquisition processing 20 to acquire a captured image from the image capture device 1 and comparison target image processing 22 and 24, and extracts curve characteristics from the comparison target data.

In the blood vessel pattern authentication device, a data acquisition processing 20 acquires blood vessel image from the image capture device 1, preprocessing 22 extracts a ROI (Region Of Interest) of the image, and characteristic extraction processing 24 performs edge extraction of the image in the ROI, performs skeletonization processing of the edge-extracted image, and extracts curve characteristics (see FIG. 3) from the skeletonized image. That is, because a blood vessel pattern is mostly curves, the curve characteristics (curves) of the blood vessel pattern are extracted.

Similarly, the processing device 2 acquires a comparison source blood vessel image in data acquisition processing 10, in preprocessing 12 a ROI of the image is extracted, and in characteristic extraction processing 14 edge extraction of the image in the ROI is performed, skeletonization processing of the edge-extracted image is performed, and curve characteristics (see FIG. 3) of the skeletonized image are extracted. In the biometrics database, the curve characteristics-have been registered; here, processing for registration in the biometrics database is described.

Next, the processing device 2 performs alignment search processing 3 of the comparison source curves and comparison target curves. In the search processing 3, comparison source characteristic conversion processing 30 creates line segment data from comparison source curve characteristics of the biometrics database, and extracts line segment characteristics (angles, lengths, center point X coordinates, center point Y coordinates) from the created line segment data. Similarly, comparison target characteristic conversion processing 32 creates line segment data from comparison target curve characteristics, and extracts line segment characteristics (angles, lengths, center point X coordinates, center point Y coordinates) from the created line segment data.

Next, in search processing 3, optimum affine transformation search processing 34 is performed. In this search processing 34, angle histogram matching is used to estimate the angle between two line segments from comparison source line segment characteristics and comparison target line segment characteristics, and then, the Shape Context method is used to estimate the scale between the two line segments. Using this angle θ and scale C, angle-scale conversion processing of one curve characteristic is performed. Then, affine transformation is used to perform parallel-displacement alignment of one curve resulting from this angle-scale conversion and the other curve. The least-squares method is then used for fine-adjustment processing of the parameters of the affine transformation.

Then, the authentication device 2 executes authentication processing 4. That is, in alignment processing 40, superpositioning of patterns from affine transformation parameters by the alignment search processing 3 is performed, similarity calculation processing 42 is executed, and similarity judgment processing 44 is executed. In similarity judgment processing 44, if the calculated similarity is equal to or above a threshold value, an authentication-OK (success) judgment is made, and if the similarity is smaller than the threshold value, an authentication-NG (failure) judgment is made.

This parallel displacement alignment processing and affine transformation fine-adjustment processing are equivalent to so-called measurement-template matching; but in this embodiment, the angles and scales for straight lines are computed, and after angle-scale-conversion, measurement-template matching is performed. Hence template matching processing can be minimized, and precise and rapid alignment is possible. That is, the affine transformation parameters can be reduced to 6 parameters, so that the number of geometrical conversion parameters can be greatly reduced in template verifying processing.

Because the straight lines in question are converted into line segment characteristics, which are an angle, a length, a center point X coordinate, and a center point Y coordinate, angle and scale computations can be executed separately. Hence computations can be separated into low-order computations for execution. As a result, faster computation is possible. And, when the objects of computations are curves, the curves can be approximated by straight lines, and the scales and angles between straight lines can be estimated, so that only low-order computations need be performed.

(Alignment Processing)

FIG. 2 shows the flow of alignment search processing in FIG. 1, and FIG. 3 explains the processing of FIG. 2. The alignment search processing of FIG. 2 is explained below, referring to FIG. 3.

(S10) Input curve characteristics 100, 200 of FIG. 3 are used to generate line segment data 102, 202 by line segment approximation. Here, one curve is divided into data for two line segments. This processing is explained in detail using FIG. 4 and FIG. 5.

(S12) Next, line segment characteristics are created from line segment data. As shown in FIG. 3, four-dimensional data, which is a scale (length) l, an angle θ, and center point X coordinate and Y coordinate for each line segment, is created from the line segment data 102, 202, and this is classified into scales and angles 104, 204, and center point X coordinates and Y coordinates 103, 203. This processing is explained in detail in FIG. 6.

(S14) From the angle and scale (length) of the created line segments, angle histograms 105 and 205 are generated. That is, for each angle, the lengths of line segments with the same angle are accumulated, to generate the angle histograms 105, 205. Then, deviations between the two angle histograms are calculated in angle estimation processing 300. By this means, deviations in the angles of line segment groups are obtained. This processing is explained in detail in FIG. 7 and FIG. 8.

(S16) The Euclidean distances between the X coordinates and Y coordinates of the center points of created line segments are calculated, and scale Shape Contexts (matrices) of the comparison source and comparison target 106, 206 are calculated. Then, scale estimation processing 302 calculates the average values of each element of the comparison source and comparison target Shape Contexts (matrices) 106, 206, and the average value of the comparison source is divided by the average value of the comparison target, to calculate the estimated scale value. This processing is explained in detail in FIG. 9 and FIG. 10.

(S18) Angle-scale conversion processing 207 performs angle and scale conversion of the comparison source curve characteristics using the calculated angle and scale. This processing is explained in detail in FIG. 11 and FIG. 12.

(S20) As shown in FIG. 3, comparison source curves 208 are parallel-displaced coincide to conform to the comparison target curves 107. The geometric parameters of the affine transformation of this parallel displacement are four parameters. This processing is explained in detail in FIG. 13 and FIG. 14.

(S22) As shown in FIG. 3, the least-squares method is used to optimize (fine-adjust) the affine transformation parameters. The affine transformation parameters are geometric conversion parameters for superpositioning; six parameters are sufficient. This processing is explained in detail in FIG. 15 and FIG. 16.

In this way, the angles and scales of straight lines are computed, and after angle and scale conversion, measurement-template matching is performed, so that the template matching processing can be minimized, and precise, rapid alignment is possible.

(Characteristic Conversion Processing)

Figure 6:
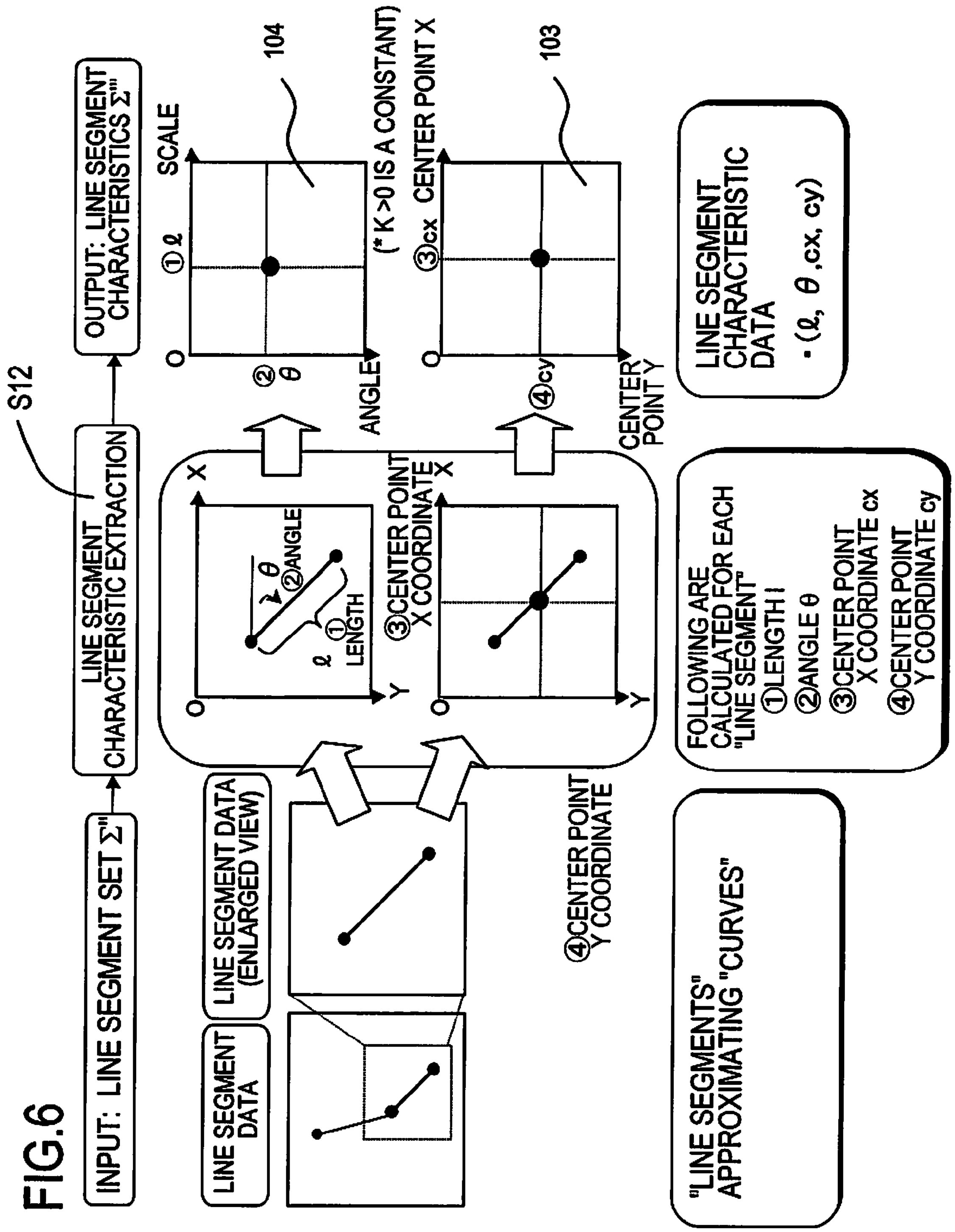
FIG. 6 explains the processing of the characteristic conversion.

The characteristic conversion processing of FIG. 2 is explained in FIG. 4 through FIG. 6.

FIG. 4 is a flow diagram of the line segment data creation processing of FIG. 2, and FIG. 5 explains operation in FIG. 4. FIG. 4 shows processing in which, for the set Y comprising curve segments, line segments approximating each S∈Σ are determined, to find Σ" as the entirety of these line segments.

(S100) Taking the starting point of a curve segment S to be "s" and the ending point to be "e", the straight line passing through the starting point s and ending point e is "l" (see FIG. 5). When the conditional equation (1) below is satisfied, the center point p' is determined using equation (2) below, and the curve segment S is divided into a curve segment S' with starting point s and ending point p', and a curve segment S" with starting point p' and ending point e (see FIG. 5).

$$\max d(p,L) > \text{threshold value } D \tag{1}$$

Here p∈S.

$$P' = \arg\max d(p,L) \tag{2}$$

Here p∈S.

(S102) The curve segment S is replaced by S' and S", and the processing of step S100 is repeated. Steps S100 and S102 are performed recursively, repeating until equation (1) no longer obtains.

(S104) For all of the curve segments E obtained in step S102, L(S) is taken to be the line segment having the starting point of the curve segment S as starting point and the ending point of the curve segment S as ending point, and the following equation (3) defines the set Σ" comprising line segments.

$$\Sigma'' = \{L(S) \mid S \in \Sigma'\} \tag{3}$$

FIG. 6 shows the flow of the line segment characteristic extraction processing of FIG. 2. This processing takes the set Σ" comprising line segments as the source to create a set Σ"', comprising the four-dimensional line segment characteristics l, θ, cx, cy. That is, for each line segment, the length l, angle θ, center point X coordinate cx, and center point Y coordinate cy are calculated. The line segment characteristics (l, θ) 104 and line segment characteristics (cx, cy) 103 are output as the line segment characteristics Σ"'.

(Optimum Affine Transformation Processing)

Figure 8:
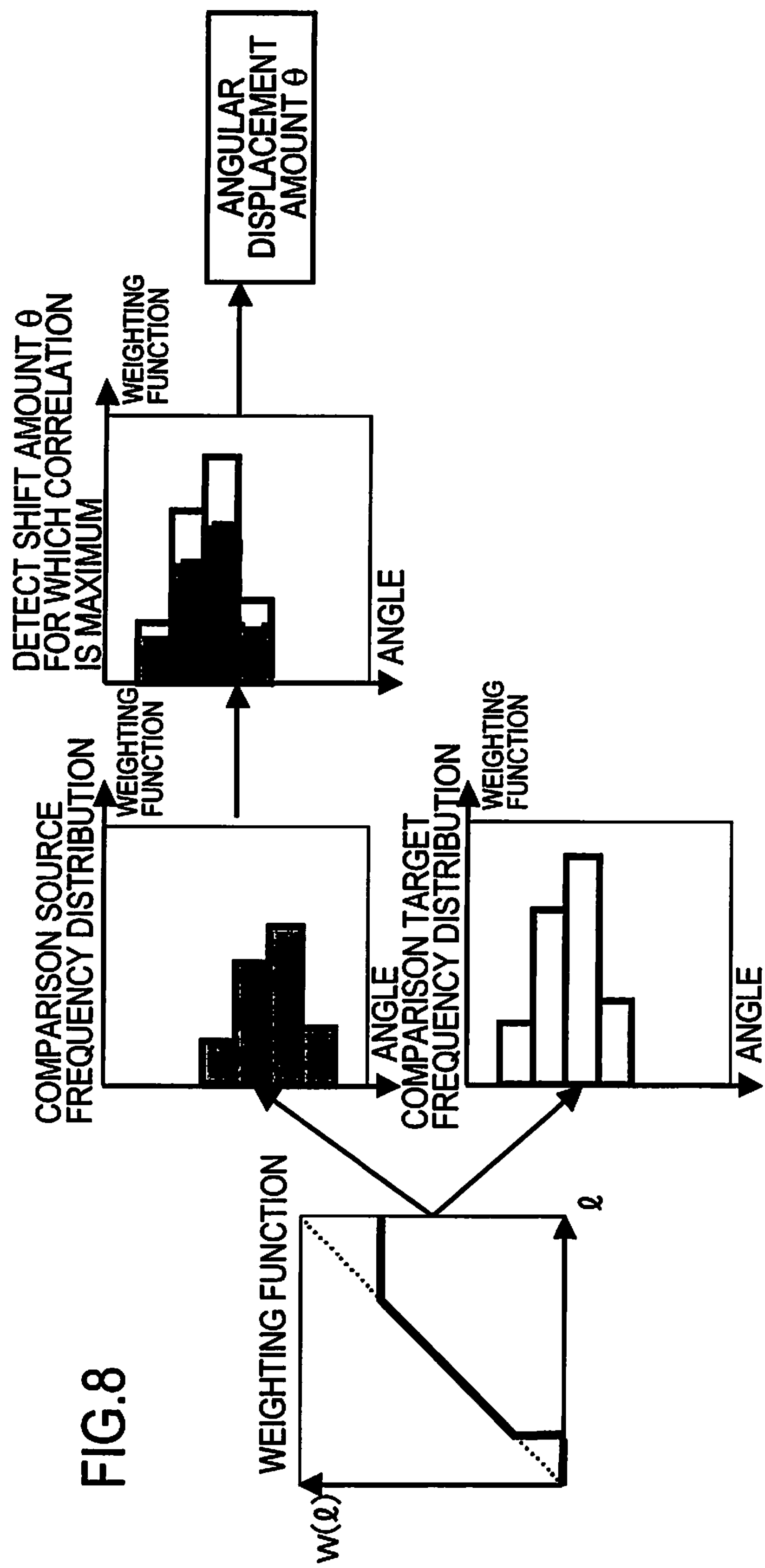
FIG. 8 explains the processing of deviations in the angles of line segment groups are obtained of FIG. 7.

FIG. 7 shows the flow of angle estimation processing of FIG. 2, and FIG. 8 explains operation in FIG. 7.

(S140) For each (l, θ, cx, cy) ∈Σ"' of the comparison source and comparison target, a weighting distribution w(l) applied to each angle partition to which angles θ belong. Here the weighting function is a non-negative monotonically increasing function. As shown in FIG. 8, the weighting function w(l) for length l yields frequency "0" in the range from 0 to small values, yields the saturation frequency in the range longer than a fixed value, and in between is set to a proportional frequency. This weighting function is provided to eliminate extremely short line segments from angle estimation, and to limit the frequency of extremely long line segments. The reason for this is that comparison target line segments are obtained from reading of captured images or other images, and extremely short line segments have low reliability. Similarly, extremely long line segments are affected by the reading conditions, so that there is low reliability in determining the length. The frequencies of line segments are added to the frequencies of angles θ corresponding to the angle distribution.

(S142) The correlation is calculated while shifting the comparison source frequency distribution (histogram) relative to the comparison target frequency distribution (histogram), and the shift amount resulting in the highest correlation is estimated to be the angle shift θ.

Figure 10:
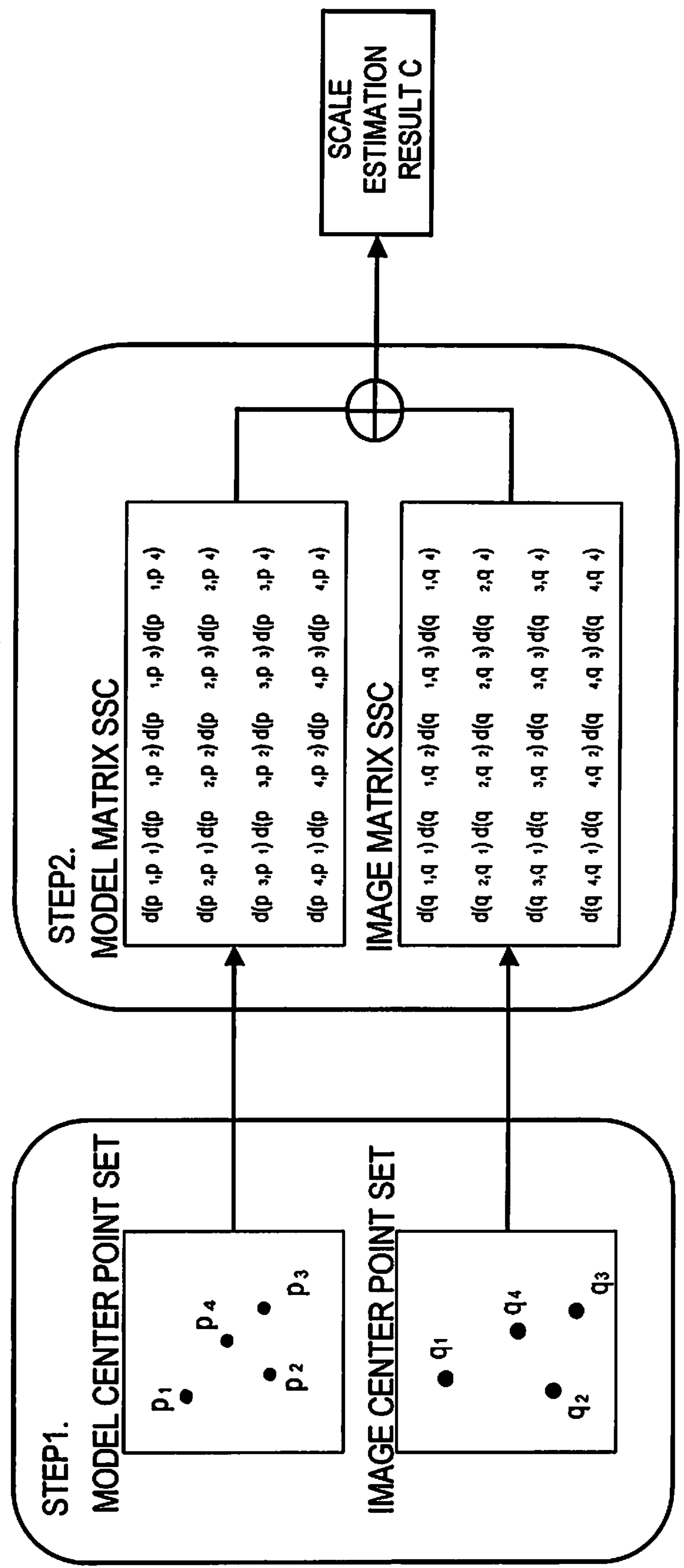
FIG. 10 explains the processing of the scale estimation processing of FIG. 9.

FIG. 9 shows the flow of scale estimation processing in FIG. 2, and FIG. 10 explains operation in FIG. 9.

(S160) As shown in FIG. 10, from the center point X coordinates and center point Y coordinates, the SSC (Scale Shape Context) for the comparison source and comparison target are determined, as in equations (4) and (5) below.

$$\text{SSC(Model)} = [d(P_i, P_j)]_{i,j} \tag{4}$$

$$\text{SSC(Image)} = [d(P'_i, P'_j)]_{i,j} \tag{5}$$

Here d is the Euclidean distance.

To explain using FIG. 10, if all the center points in the comparison source (model) are (p1, p2, p3, p4), then the matrix SSC(Model) is obtained by arranging the Euclidean distances between the points in a matrix. Similarly, if all the center points in the comparison target (image) are (q1, q2, q3, q4), then the matrix SSC(Image) is obtained by arranging the Euclidean distances between the points in a matrix.

(S162) The scale C is calculated by calculating the mean value of each element in the matrix A and dividing the comparison target by the comparison source, as in equation (6) below.

$$C = \text{mean(SSC(Image))}/\text{mean(SSC(Model))} \tag{6}$$

FIG. 11 shows the flow of the angle-scale conversion processing of FIG. 2, and FIG. 12 explains operation in FIG. 11. The estimated angle value θ and estimated scale value C are used to perform scale (magnification, reduction) and rotation conversion for the curve patterns of the comparison source. That is, x and y for each point of the curve patterns are used in equations (7) and (8) below to calculate the converted points (x', y').

$$x' = (C \cdot \cos\theta) \cdot x + (-C \cdot \sin\theta) \cdot y \tag{7}$$

$$y' = (C \cdot \sin\theta) \cdot x + (C \cdot \cos\theta) \cdot y \tag{8}$$

As shown in FIG. 12, taking the origin as the center, rotation by θ and scaling by C are performed. At this time, the parameters of the affine transformation are the four parameters of equations (7) and (8).

Figure 14:
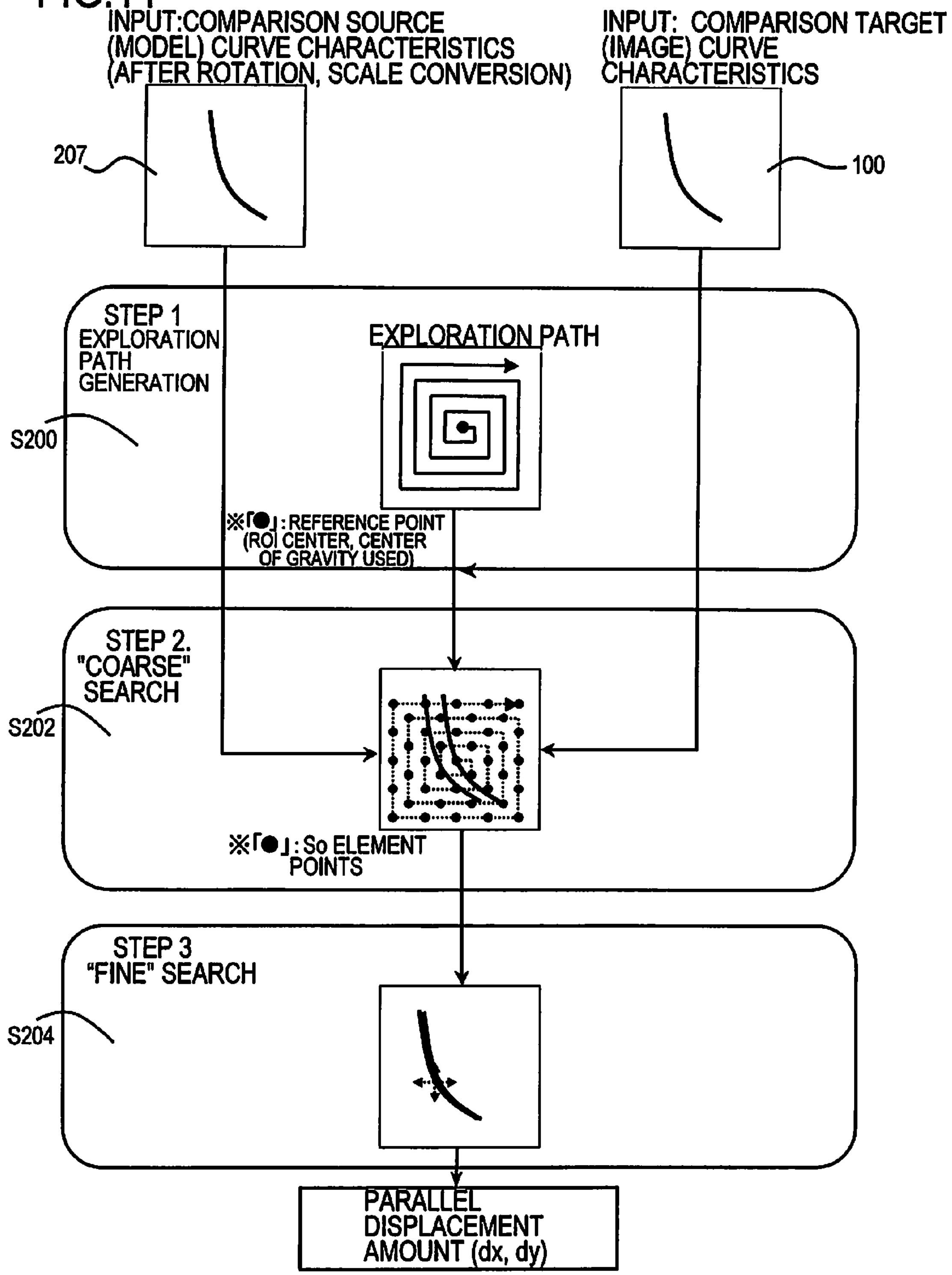
FIG. 14 explains the affine transformation processing of the parallel displacement of FIG. 13.

FIG. 13 shows the flow of the parallel-displacement alignment processing of FIG. 2, and FIG. 14 explains operation in FIG. 13.

(S200) Exploration path generation is performed. That is, as shown in FIG. 14, a set in a spiral-shape order (spiral movement vectors) S(={Si}i ∈N ⊂R*R) is determined.

(S202) Coarse exploration is performed. That is, as shown in FIG. 14, a subset N0 of N (the natural numbers) is created, and the submatrix S0={Si}i ∈N0 of the set S is taken. In FIG. 14, black circles represent S0 elements. For each i, the error evaluation function value dist (curve(model)+si, curve(image)) of the comparison target curve 100 for the comparison source curve 207 after rotation/scale conversion is evaluated.

When the evaluation function value is less than a constant value, an early acceptance condition is met and processing is interrupted, the value Si=(dx, dy) at this time is taken to be the parallel displacement amount, and processing is ended.

(S204) Fine search is performed. The subscript Si is moved densely in a promising area within a fixed threshold value according to the error evaluation function, or in a vicinity (a promising interval) of the best subscript value Si in the coarse exploration. The si (dx, dy) for which the error evaluation function dist is minimum is taken to be the parallel displacement amount.

In this way, by tracing over a spiral shape, and performing exploration (tracing) in coarse steps, fine tracing is performed over a promising interval. When the solution is judged to be close enough, processing is halted. By this means, parallel-displacement alignment can be performed rapidly.

Figure 15:
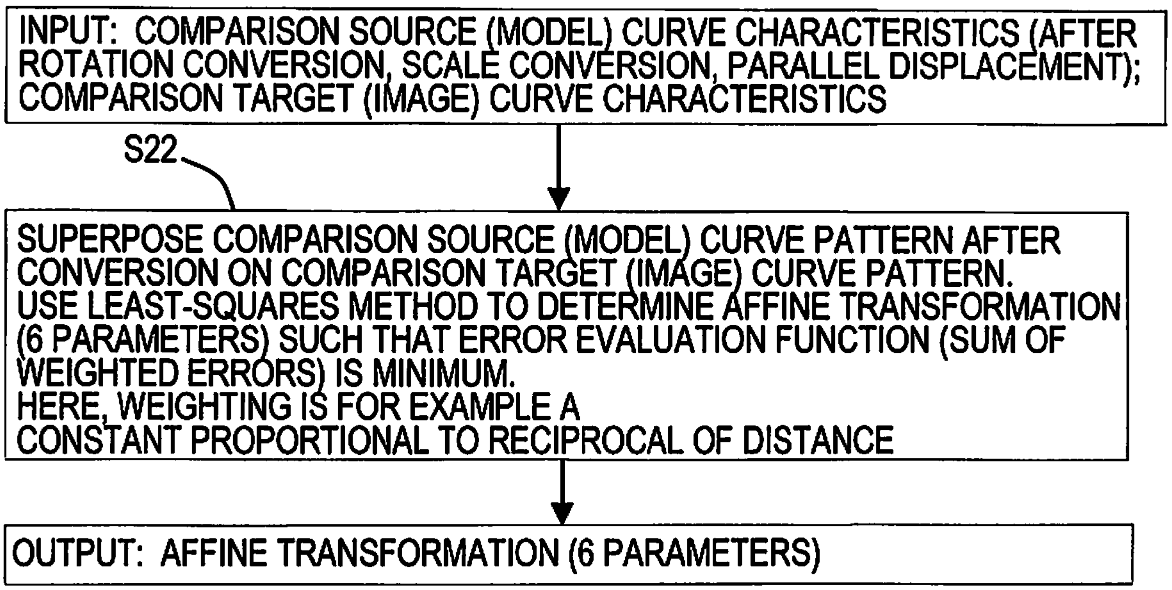
FIG. 15 is a flow chart of the processing of superpositioning affine transformation parameters of FIG. 2.
Figure 16:
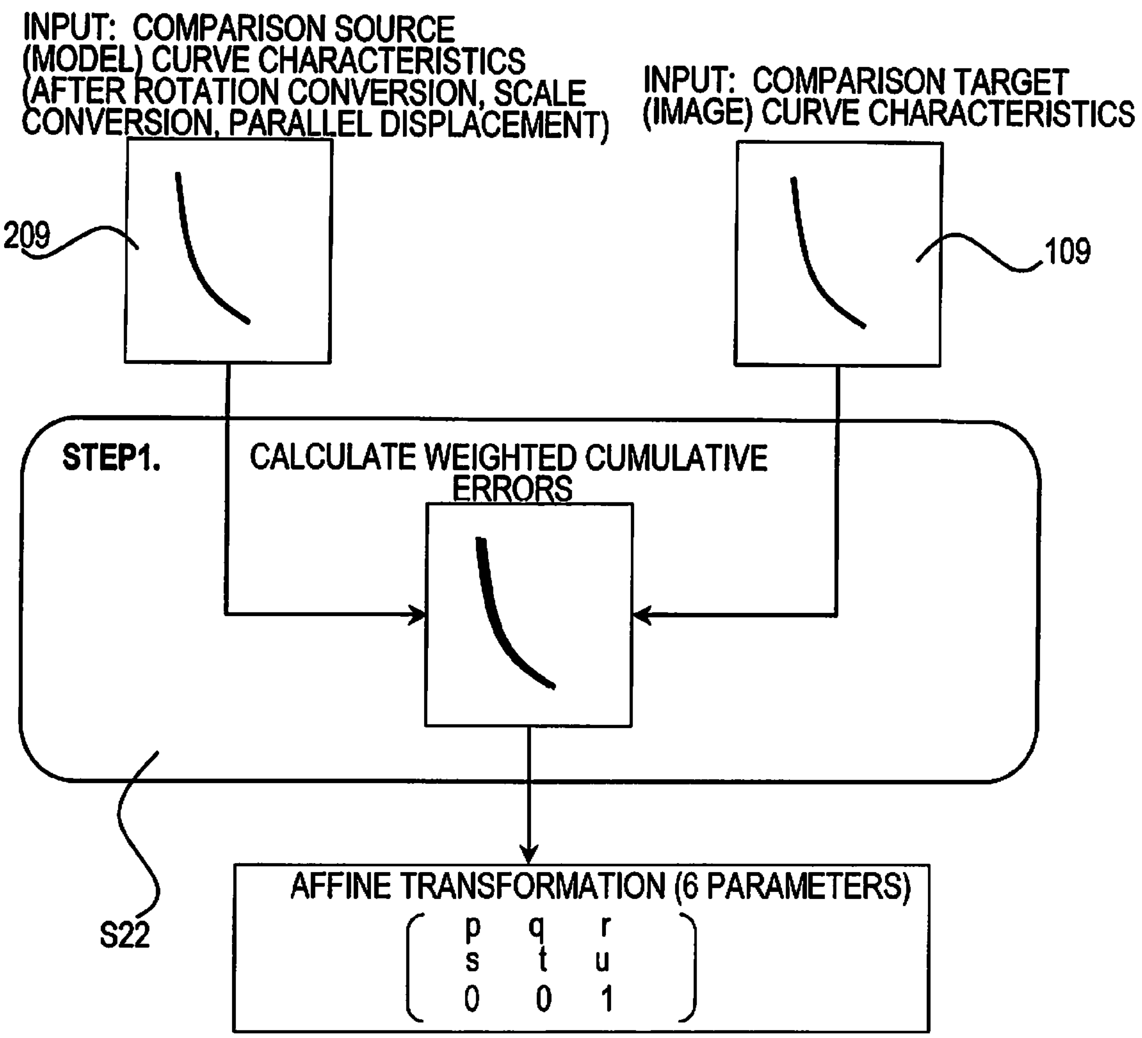
FIG. 16 explains the processing of superpositioning affine transformation parameters of FIG. 15.

FIG. 15 shows the flow of the affine transformation parameter optimization processing of FIG. 2, and FIG. 16 explains operation in FIG. 15. The comparison source curve characteristics (after rotation conversion, scale conversion, and parallel displacement) and the comparison target curve characteristics are input, the converted comparison source curve pattern is superposed on the comparison target curve pattern, and the least-squares method is used to determine the affine transformation parameters which minimize the error evaluation function (sum of weighted errors). Here, weighting is for example by constants proportional to the reciprocal of the distance.

By this means, the affine transformation parameters become the six parameters p, q, r, s, t, u.

In this way, the angles and scales of straight lines are computed separately, and after angle-scale conversion, measurement-template matching is performed, so that the template matching processing can be minimized, and rapid alignment is possible. Moreover, template matching is performed by doing a coarse trace, and then fine tracing over a promising interval. When the solution is judged to be sufficiently close, processing is halted. By this means, parallel-displacement alignment can be made faster.

Further, extremely short line segments are eliminated, and moreover the frequency of extremely long line segments is set to a saturation value, so that the angle can be estimated accurately. As a result, precise alignment is possible.

Other Embodiments

In the above-described embodiments, an authentication system was explained for the case of a blood vessel pattern authentication system; however, the invention can also be applied to authentication of blood vessel patterns of the palm or back of the hand or the fingers, and to palmprints and characteristics other than blood vessel patterns, as well as biometrics authentication of fingerprints, facial features, and similar. Further, in addition to biometrics authentication, application to other linear pattern alignment and verifying is also possible. Also, while application to curves has been explained, the invention can also be used for straight lines alone.

Accordingly, it should be understood that we intend to cover by the appended claims all modifications falling within the true spirit and scope of the invention.

Because angular deviations and scale factors between the comparison source pattern and the comparison target pattern are computed separately, after angle and scale conversion, the measured template verifying is performed, so that template verifying processing can be minimized, and aligning can be performed precisely and rapidly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A pattern alignment method, comprising:

a first step of calculating an angle, scale, center point x coordinate, and center point Y coordinate, for each of a comparison source pattern and a comparison target pattern;

a second step of calculating an angle deviation between the comparison source pattern and the comparison target pattern, from the angle and scale for the comparison source pattern and the comparison target pattern;

a third step of calculating scale ratios of the comparison source pattern and the comparison target pattern, from the center point X coordinates and center point Y coordinates of the comparison source pattern and the comparison target pattern;

a fourth step of performing angle and scale conversion of the comparison source pattern or the comparison target pattern, using the angle and ratios; and a fifth of, by using template matching, performing alignment of the comparison source pattern or the comparison target pattern that has been subjected to the angle-scale conversion with the comparison source pattern or the comparison target pattern that has not been subjected to the angle-scale conversion.

2. The pattern alignment method according to claim 1, wherein the first step comprises a step of calculating the angle, scale, center point X coordinate, and center point Y coordinate, for each of a plurality of the comparison source patterns and a plurality of the comparison target patterns;

and the second step comprises a step of calculating the angle deviations from each of angles and scales of the plurality of comparison source patterns and the plurality of comparison target patterns;

and the third step comprises a step of calculating the ratios from the center point X coordinates and center point Y coordinates of the plurality of comparison source patterns and the plurality of comparison target patterns.

3. The pattern alignment method according to claim 1, further comprising:

a step of converting a comparison source curve pattern into a linear comparison source pattern; and a step of converting a comparison target curve pattern into a linear comparison target pattern.

4. The pattern alignment method according to claim 1, wherein the second step comprises:

a step of creating a first angle distribution in which scales of the comparison source pattern are angle frequencies and of creating a second angle distribution in which scales of the comparison target pattern are angle frequencies; and a step of calculating the angle deviation from the first and second angle distributions.

5. The pattern alignment method according to claim 4, wherein the step of creating angle distributions comprises a step of weighting, by a weighting function, the scales of the comparison source pattern and the comparison target pattern to be converted into the frequencies.

6. The pattern alignment method according to claim 1, wherein the third step comprises:

a step of calculating scale shape contexts of each of the comparison source pattern and the comparison target pattern from the center point X coordinates and center point Y coordinates of the comparison source pattern and the comparison target pattern; and a step of calculating a scale ratio from mean values of each of elements of each of the scale shape contexts.

7. The pattern alignment method according to claim 1, wherein the fifth step comprises a step of parallel-displacement aligning the comparison source pattern or the comparison target pattern that has been subjected to the angle-scale conversion, to the comparison source pattern or the comparison target pattern that has not been not subjected to the angle-scale conversion.

8. A pattern verifying method, comprising:

a first step of calculating an angle, scale, center point X coordinate, and center point Y coordinate, for each of a comparison source pattern and a comparison target pattern;

a second step of calculating an angle deviation between the comparison source pattern and the comparison target pattern, from the angle and scale for the comparison source pattern and the comparison target pattern;

a third step of calculating scale ratios of the comparison source pattern and the comparison target pattern, from the center point X coordinates and center point Y coordinates of the comparison source pattern and the comparison target pattern;

a fourth step of performing angle and scale conversion of the comparison source pattern or the comparison target pattern, using the angle and ratio;

a fifth step of, by using template matching, performing alignment of the comparison source pattern or the comparison target pattern that has been subjected to the angle-scale conversion with the comparison source pattern or the comparison target pattern that has not been subjected to the angle-scale conversion; and a sixth step of calculating similarity of the aligned comparison source pattern and the comparison target pattern, and performing verifying.

9. The pattern verifying method according to claim 8, wherein the first step comprises a step of calculating the angle, scale, center point X coordinate, and center point Y coordinate, for each of a plurality of the comparison source patterns and a plurality of the comparison target patterns;

the second step comprises a step of calculating angle deviations from each of angles and scales of the plurality of comparison source patterns and the plurality of comparison target patterns; and the third step comprises a step of calculating the ratios from the center point X coordinates and center point Y coordinates of the plurality of comparison source patterns and the plurality of comparison target patterns.

10. The pattern verifying method according to claim 8, further comprising:

a step of converting a comparison source curve pattern into a linear comparison source pattern; and a step of converting a comparison target curve pattern into a linear comparison target pattern.

11. The pattern verifying method according to claim 8, wherein the second step comprises:

a step of creating a first angle distribution in which scales of the comparison source pattern are angle frequencies and of creating a second angle distribution in which scales of the comparison target pattern are angle frequencies; and a step of calculating the angle deviation from the first and second angle distributions.

12. The pattern verifying method according to claim 11, wherein the step of creating angle distributions comprises a step of weighting, by a weighting function, the scales of the comparison source pattern and the comparison target pattern to be converted into the frequencies.

13. The pattern verifying method according to claim 8, wherein the third step comprises:

a step of calculating scale shape contexts of each of the comparison source pattern and the comparison target pattern from the center point X coordinates and center point Y coordinates of the comparison source pattern and the comparison target pattern; and a step of calculating a scale ratio from mean values of each of elements of each of the scale shape contexts.

14. The pattern verifying method according to claim 8, wherein the fifth step comprises a step of parallel-displacement aligning the comparison source pattern or the comparison target pattern that has been subjected to the angle-scale conversion, to the comparison source pattern or the comparison target pattern that has not been subjected to the angle-scale conversion.

15. A pattern verifying device, comprising:

an acquisition unit which acquires a comparison target pattern; and a verifying unit which matches a comparison source pattern with the comparison target pattern, wherein the verifying unit calculates an angle, scale, center point X coordinate, and center point Y coordinate for each of the comparison source pattern and the comparison target pattern, calculates an angle deviation between the comparison source pattern and the comparison target pattern from the angle and scale of the comparison source pattern and the comparison target pattern, and calculates the scale ratio of the comparison source pattern and the comparison target pattern from the center point X coordinate and center point Y coordinate of the comparison source pattern and the comparison target pattern, and wherein the verifying unit angle-scale converts the comparison source pattern or the comparison target pattern using the angle and ratio, aligns, by template matching, the comparison source pattern or the comparison target pattern that has been subjected to angle-scale conversion, and the comparison source pattern or the comparison target pattern that has not been subjected to angle-scale conversion, and calculates the similarity of the comparison source pattern and the comparison target pattern after the alignment to perform verifying.

16. The pattern verifying device according to claim 15, wherein the verifying unit calculates angles, scales, center point X coordinates, and center point Y coordinates for each of a plurality of the comparison source patterns and a plurality of the comparison target patterns; calculates the angle deviations from each of the angles and scales of the plurality of comparison source patterns and the plurality of comparison target patterns; and calculates the ratios from the center point X coordinates and center point Y coordinates of the plurality of comparison source patterns and the plurality of comparison target patterns.

17. The pattern verifying device according to claim 15, wherein the verifying unit converts a comparison source curve pattern into a linear comparison source pattern, and converts a comparison target curve pattern into a linear comparison target pattern.

18. The pattern verifying device according to claim 15, wherein the verifying unit creates a first angle distribution in which the scales of the comparison source pattern are angle frequencies, creates a second angle distribution in which the scales of the comparison target pattern are angle frequencies, and calculates the angle deviation from the first and second angle distributions.

19. The pattern verifying device according to claim 18, wherein the verifying unit weights the scales of the comparison source pattern and the comparison target pattern by a weighting function, and converts the frequencies.

20. The pattern verifying device according to claim 15, wherein the verifying unit calculates scale shape contexts of each of the comparison source pattern and the comparison target pattern from the center point X coordinates and center point Y coordinates of the comparison source pattern and the comparison target pattern, and calculates the scale ratio from mean values of each of elements of each of the scale shape contexts.

21. The pattern verifying device according to claim 15, wherein the verifying unit parallel-displacement aligns the comparison source pattern or the comparison target pattern that has been subjected to the angle-scale conversion, to the comparison source pattern or the comparison target pattern that has not been subjected to the angle-scale conversion.

22. The pattern verifying device according to claim 15, wherein the comparison source pattern and the comparison target pattern are biometrics pattern, and the verifying is biometrics authentication.

* * * * *